July 12, 1927.
H. S. CASSEL
1,635,708
FRONT WHEEL BRAKE FOR AUTOMOBILES AND THE LIKE
Filed April 2, 1925
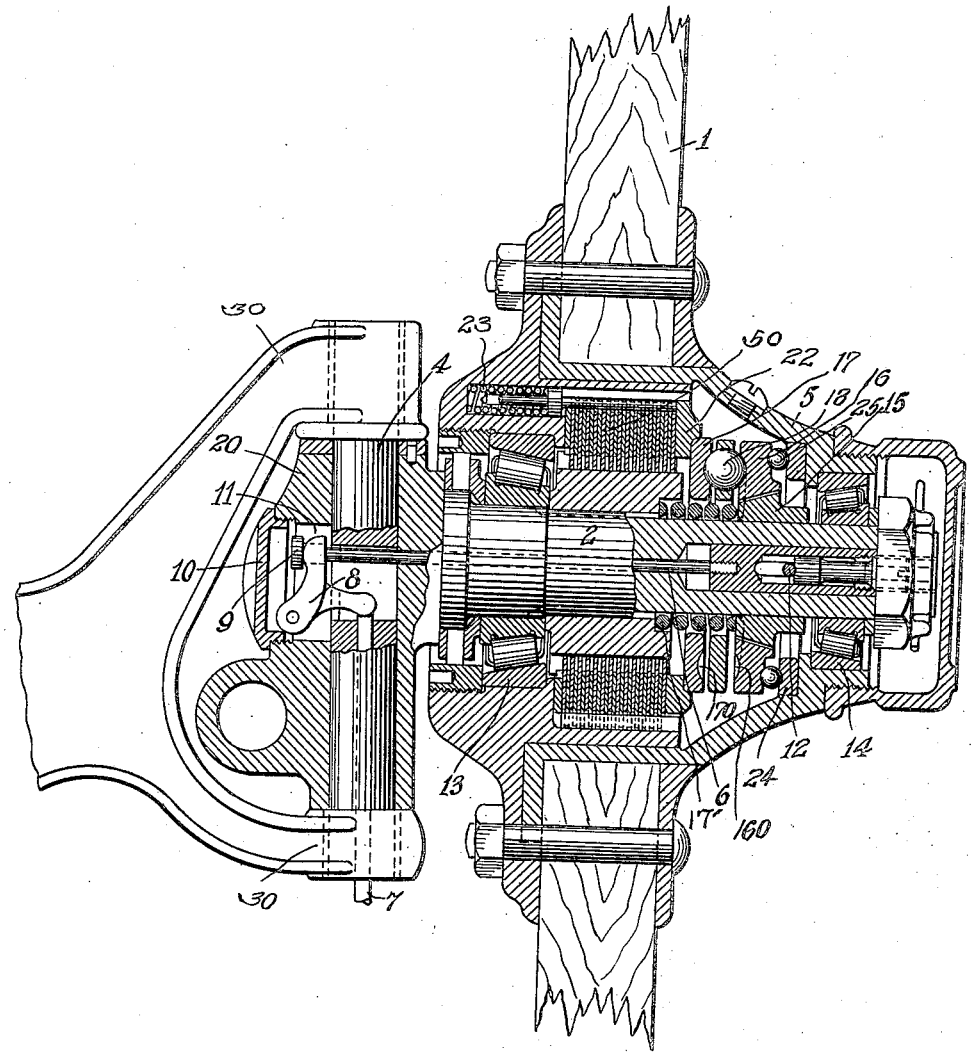
INVENTOR:
Hjalmar S. Cassel
ATTORNEY Patented July 12, 1927.

1,635,708

UNITED STATES PATENT OFFICE.

HJALMAR SIGFRID CASSEL, OF LUND, SWEDEN, ASSIGNOR TO AKTIEBOLAGET SVENSKA KULLAGERFABRIKEN, A CORPORATION OF SWEDEN.

FRONT WHEEL BRAKE FOR AUTOMOBILES AND THE LIKE.

Application filed April 2, 1925, Serial No. 20,030, and in Sweden April 8, 1924.

This invention relates to front wheel brakes for automobiles and the like, in which such front wheels are adapted to turn about substantially vertical knuckle pins.

The object of the invention is to provide simple and reliable means for actuating a brake situated on the wheel. The brake may be of any suitable kind, but is preferably placed within the wheel hub.

In the drawing a form of embodiment of the invention applied to the hub brake of an automobile is shown in axial section.

With reference to the drawing, the wheel may be assumed to be represented by the broken away spokes, 1, and is mounted on a wheel spindle, 2, having at its end one member, 20, of a steering knuckle which carries the vertically disposed knuckle pin, 4, which is journaled in the forked end of the axle, 3, these forks, 30—30, constituting the other member of the steering knuckle.

The brake, 50, illustrated is of the friction disc or so-called lamellated type. The hub, 5, is shown hollow and mounted on an inner and an outer anti-friction bearing, 13—14, the disc brake being shown housed within the hub and located outwardly of the inner bearing.

The mechanism for immediately compressing the discs and for causing their release comprises a screw or cam device and may be termed a pressure thrust bearing, which is more fully described in my copending application, Serial No. 741,355, filed October 3rd, 1924, and which comprises a washer, 17, engaging the plate, 22, which is in position to compress together the lamellæ. This washer, 17, is provided with a groove, 170, such as is frequently employed in thrust bearings. The other washer, 16, of such bearing or screw device is provided with a series of sloping indentations, 160, in each of which is mounted a ball, 18. The balls, 18, are free to run in the groove, 170. The pressure from the washer, 16, is taken from the opposite or outward direction by means of a thrust bearing washer, 24, and row of balls. 25. A spring, 17', is provided for normally holding the taper of the clutch member, 15, from engagement with the tapered bore of the member, 16. Springs, 23, are provided for forcing the plate, 22, away from the lamellæ so as to interrupt the frictional engagement of these parts.

The brake is operated in the present illustration by means of a pull rod, 6, mounted in a suitable bore or bearing of the wheel spindle, 2. At the outer end of this rod, 6, there is a cross pin, 12, passing through an elongated hole in the spindle and engaging the tapered clutch member, 15.

When the rod, 6, is drawn to the left in the illustration the tapers on the member, 15, and on the bore of the washer, 16, engage so that the washer is caused to rotate and by means of the cam formation of the grooves, 160, it rides up upon the balls, 18, forcing the washer, 17, and the plate, 22, toward the left, thereby compressing the discs of the friction brake and applying a braking action in accordance with the actuating pressure employed.

The longitudinal movement of the rod 6, is effected in the present instance by means of an angle lever, 8, one end of which engages the abutment face or head, 9, formed on the rod, 6, and the other end of which is in position to be raised by means of a rod, 7, mounted in a bore or bearing in the knuckle pin, 4. The rod, 7, will generally in practice be connected to a pedal arrangement within the car. In the illustration the rod, 7, is shown placed in the lower part of the pin, 4, and depending therefrom.

The angle lever, 8, is shown mounted in a recess or chamber in the inner end or the knuckle forming portion, 20, of the wheel spindle, such recess being shown closed by an oil tight cover, 10, whereby the whole device is enclosed in an oil tight compartment to which lubricating oil may be supplied in some convenient or well known manner.

I claim:

1. In a front wheel brake for automobiles and the like, the combination with an axle provided at each end with a steering knuckle member, of a wheel spindle provided with another steering knuckle member, a pin uniting the said knuckle members, a wheel provided with a hub mounted on such spindle, a brake associated with the hub, the spindle being provided with a bore constituting a bearing, a rod adapted to move longitudinally in such bore and connected to the brake, there being a bore in the knuckle pin constituting a bearing and an actuating rod located in such bore for longitudinal movement, and means for transmitting motion from the said actuating rod to the rod within the wheel spindle.

2. In a front wheel brake for automobiles and the like, the combination with an axle provided at each end with a steering knuckle member, of a wheel spindle provided with another steering knuckle member, a pin uniting the said knuckle members, a wheel provided with a hub mounted on such spindle, a brake associated with the hub, the spindle being provided with a bore constituting a bearing, a rod adapted to move longitudinally in such bore and connected to the brake, there being a bore in the knuckle pin constituting a bearing and an actuating rod located in such bore for longitudinal movement, and an angle lever for transmitting motion from the said actuating rod to the rod within the wheel spindle.

3. In a front wheel brake for automobiles and the like, the combination with an axle provided at each end with a steering knuckle member, of a wheel spindle provided with another steering knuckle member, a pin uniting the said knuckle members, a wheel provided with a hub mounted on such spindle, a brake associated with the hub, the spindle being provided with a bore constituting a bearing, a rod adapted to move longitudinally in such bore and connected to the brake, there being a bore in the knuckle pin constituting a bearing and an actuating rod located in such bore for longitudinal movement, and means for transmitting motion from the said actuating rod to the rod within the wheel spindle, there being an oil tight recess formed in the knuckle member of the spindle and enclosing the said motion transmitting means.

4. In a front wheel brake for automobiles and the like, the combination with a wheel spindle, a wheel having a hub mounted upon such spindle, a brake associated with the wheel comprising a member adapted to move longitudinally of the spindle, such spindle being provided with a longitudinal bore constituting a bearing, a rod mounted in such bore for longitudinal movement, there being slots extending through the spindle and entering said bore, and a pin connected to the said rod passing through such slots and connected to the said longitudinally movable brake member.

5. In a front wheel brake for automobiles and the like, the combination with an automobile axle, of a wheel spindle carried thereby, a wheel having a hub surrounding such spindle, there being an inner and an outer anti-friction bearing mounted upon the spindle and within the hub, the spindle being provided with a bore constituting a bearing, a rod mounted for longitudinal movement in said bore, means for actuating the said rod, there being slots formed in the spindle extending into the said bore, a member provided with a clutch taper mounted on the spindle between the said bearings, and a pin passing through the said slots and connected to the said member and to the said rod.

In testimony whereof I have signed my name.

HJALMAR SIGFRID CASSEL.